United States Patent
Yan et al.

(10) Patent No.: US 12,502,194 B2
(45) Date of Patent: Dec. 23, 2025

(54) ULTRASONIC SCALPEL BLADE

(71) Applicant: INNOLCON MEDICAL TECHNOLOGY (SUZHOU) CO., LTD., Jiangsu (CN)

(72) Inventors: Zhongyu Yan, Jiangsu (CN); Lei Wang, Jiangsu (CN); Zhenzhong Liu, Jiangsu (CN); Wei Luo, Jiangsu (CN)

(73) Assignee: Innolcon Medical Technology (Suzhou) Co., Ltd., Suzhou (CN)

( * ) Notice: Subject to any disclaimer, the term of this patent is extended or adjusted under 35 U.S.C. 154(b) by 265 days.

(21) Appl. No.: 18/549,136

(22) PCT Filed: Apr. 28, 2022

(86) PCT No.: PCT/CN2022/089894
§ 371 (c)(1),
(2) Date: Sep. 5, 2023

(87) PCT Pub. No.: WO2022/188897
PCT Pub. Date: Sep. 15, 2022

(65) Prior Publication Data
US 2024/0156484 A1    May 16, 2024

(30) Foreign Application Priority Data
Mar. 8, 2021 (CN) .......................... 202110249743.2

(51) Int. Cl.
*A61B 17/32* (2006.01)
*A61B 17/00* (2006.01)

(52) U.S. Cl.
CPC ................. *A61B 17/320068* (2013.01); *A61B 2017/00982* (2013.01)

(58) Field of Classification Search
CPC .............. A61B 17/320068; A61B 2017/00982
See application file for complete search history.

(56) References Cited

U.S. PATENT DOCUMENTS

| | | |
|---|---|---|
| 2001/0027325 A1 | 10/2001 | Beaupre |
| 2015/0045701 A1 | 2/2015 | Akagane |
| 2016/0367281 A1 | 12/2016 | Gee et al. |
| 2017/0119425 A1 | 5/2017 | Hibner et al. |

(Continued)

FOREIGN PATENT DOCUMENTS

| | | |
|---|---|---|
| CN | 107595368 A | 1/2018 |
| CN | 107690484 A | 2/2018 |

(Continued)

*Primary Examiner* — Ashley L Fishback
(74) *Attorney, Agent, or Firm* — Seed Intellectual Property Law Group LLP

(57) ABSTRACT

Provided is an ultrasonic surgical knife blade. The projection of the blade on a shear plane is banana-like curved shape. From a proximal end to a distal end, the thickness of the blade varies from thick to thin, and then to thick and to thin again. The projection on a vertical shear plane is fruit knife-shaped. The height of the blade varies from high to low, and then gradually decreases, and an arc-shaped cutting groove is formed in the middle position. The present invention allows for an increase of swing amplitude in the bending direction and the effective working length of the blade. A boat-shaped or arc-shaped balance cutting groove is provided between the most distant node and a tip of the blade, such that the stability of ultrasonic vibration is improved.

20 Claims, 3 Drawing Sheets

(56) References Cited

U.S. PATENT DOCUMENTS

2019/0262027 A1  8/2019  Akagane
2020/0022720 A1  1/2020  Cao et al.

FOREIGN PATENT DOCUMENTS

| CN | 107750141 A | 3/2018 |
|---|---|---|
| CN | 110327100 A | 10/2019 |
| CN | 110662497 A | 1/2020 |
| CN | 113017777 A | 6/2021 |
| CN | 215584294 U | 1/2022 |

ULTRASONIC SCALPEL BLADE

BACKGROUND

Technical Field

The present invention relates to the field of medical device, in particular to an ultrasonic scalpel blade.

Description of the Related Art

Ultrasonic scalpel refers to a device which further amplifies the ultrasonic vibration obtained by a piezoelectric transducer (the electric energy is transmitted to the piezoelectric transducer by an energy generator, and the electric energy is converted into ultrasonic mechanical energy by the piezoelectric transducer), and uses the amplified ultrasonic vibration by the blade of the scalpel to cut and coagulate soft tissue. Clinical use of this device allows for lesion excision at lower temperatures with less bleeding and ensures minimal lateral thermal tissue damage. With the popularization of minimally invasive surgery, ultrasonic scalpel has become a regular surgical device.

At present, the clamping length (and the working length) of the ultrasonic scalpel is generally short, and the length of single cutting is mostly about 13 mm, resulting in high frequency of intraoperative tissue separation operation and long operation time. A shorter clamping length also results in a significant decrease in sealing reliability in cases where the blood vessel diameter exceeds 3 mm, and is incapable for blood vessels with a diameter of more than 5 mm. In addition, the surgery time is too long due to the small vibration amplitude.

BRIEF SUMMARY

The present invention provides an ultrasonic scalpel blade having an improved hemostatic effect and an increased effective working length to solve the above-mentioned problems of the prior art.

In order to solve the above technical problem, the present invention provides the following technical solution.

An ultrasonic scalpel blade, comprising a blade tail at a proximal end and a blade tip at a distal end; an engagement surface between the blade and a claw pad of the ultrasonic scalpel assembly is a shear plane, wherein the projection of the ultrasonic scalpel blade on the shear plane is a banana-like curved shape, a varied thickness is formed from the blade tail to the blade tip, and the thicknesses are respectively T1, T2, T3, T4 in order, wherein T1>T3>T2>T4, and T1=T2+T3+T4, with an error of ±10%.

An ultrasonic scalpel blade, comprising a blade tail at a proximal end and a blade tip at a distal end, wherein an engagement surface between the blade and a claw pad of the ultrasonic scalpel assembly is a shear plane, and the projection of the ultrasonic scalpel blade on the shear plane is a banana-like curved shape, which comprises a front concave surface and a rear convex surface, wherein the front concave surface has a length of L1 and a radian radius of R2, and the rear convex surface has a length of L2, and comprises a first convex surface adjacent to the blade tail and a second convex surface adjacent to the blade tip, which are in a smooth transition; the first convex surface has a radius R4 and the second convex surface has a radius R3; the thickness of the blade tail is T1, the thickness of the blade tip is T4, and an angle between a center line at the blade tip and a horizontal line is α, which satisfies the following formula:

$$L1 = L2 + \frac{R2 - R3}{R4} \cdot T1 \cdot \sin\alpha + T4,$$

with an error of ±10%.

Preferably, the length L1 of the front concave surface is in the range of 15 mm and 19 mm, preferably 17.5 mm.

Preferably, the radian radius R2 of the front concave surface is in the range of 19 mm and 25 mm, preferably 22 mm.

Preferably, the length L2 of the rear convex surface is in the range of 13 mm and 17 mm, preferably 14.5 mm.

Preferably, the radius R4 of the first convex surface of the rear convex surface is in the range of 3 mm and 7 mm, preferably 5 mm, and the radius R3 of the second convex surface is in the range of 12 mm and 16 mm, preferably 14 mm.

Preferably, the blade tail 101 at a proximal end has a cylindrical section which extends to the proximal end.

Preferably, the highest point of the blade tip is higher than the highest point of the cylindrical section and the lowest point of the second convex surface is lower than the lowest point of the cylindrical section on the projection on the shear plane.

An ultrasonic scalpel blade, comprising a blade tail at a proximal end and a blade tip at a distal end; an engagement surface between the blade and a claw pad of the ultrasonic scalpel assembly is a shear plane; the projection of the ultrasonic scalpel blade on the shear plane is a banana-like curved shape, the projection of the ultrasonic scalpel blade on a plane perpendicular to the shear plane is fruit knife-shaped, the height gradually decreasing from the blade tail to the blade tip, and an arc-shaped cutting groove being provided near the blade tail.

The radius R1 of the arc-shaped cutting groove is preferably 7 mm.

Preferably, the blade is provided at its upper end with an arc-shaped profile and at its lower end with a V-shaped profile.

Preferably, the width of the distal end of the ultrasonic scalpel blade in a direction perpendicular to the shear plane is half of the diameter of the proximal end.

An ultrasonic scalpel blade, comprising a blade tail at a proximal end and a blade tip at a distal end; an engagement surface between the blade and a claw pad of the ultrasonic scalpel assembly is a shear plane; the projection of the ultrasonic scalpel blade on the shear plane is banana-like curved shape, at least one balancing groove being provided between the blade tail and a first node of the ultrasonic scalpel.

Preferably, the projection of the balancing groove on the shear plane is a boat-shaped structure, or an arc-shaped structure, or a combination of the boat-shaped structure and the arc-shaped structure.

Advantageous effects of the present invention are mainly as follows. The projection of the ultrasonic scalpel blade on a shear plane is a banana-like curved shape. From a proximal end to a distal end, the thickness of the blade varies from thick to thin, and then to thick and to thin again. The projection on a plan perpendicular to the shear plane is fruit knife-shaped, the height of the blade changes from high to low gradually, and an arc-shaped cutting groove is formed in the middle position. The combined above features result in an increase of lateral vibration in the bending direction and the effective working length of the blade. A boat-shaped or arc-shaped balance groove is provided between the most distant node of the blade and the blade tip, such that the stability of ultrasonic vibration is improved.

DETAILED DESCRIPTION

The present invention will be described in detail with reference to the embodiments shown in the accompanying drawings. However, these embodiments are not limited to the present invention, and structural, methodological, or functional changes made by a person skilled in the art according to these embodiments are included in the scope of the present invention.

Figure 1:
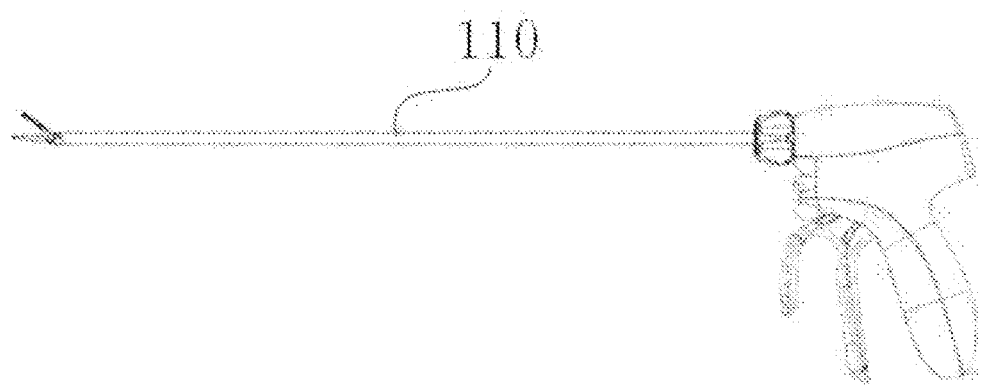
FIG. 1 is a schematic view showing an ultrasonic scalpel used for a laparoscopic surgical device according to the present invention.
Figure 2:
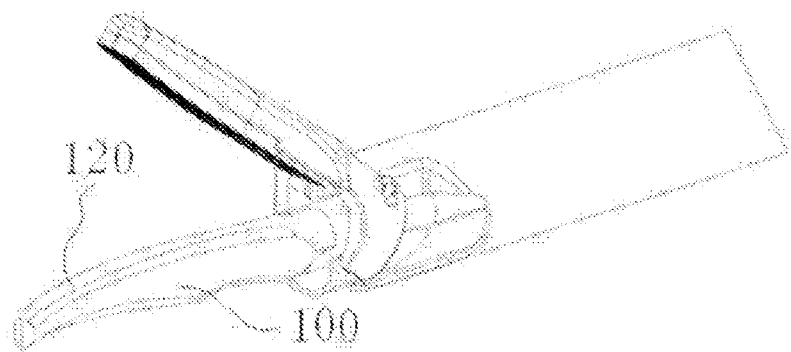
FIG. 2 is a detailed assembly view showing an ultrasonic scalpel blade used for an endoscopic surgical device according to the present invention.
Figure 3:
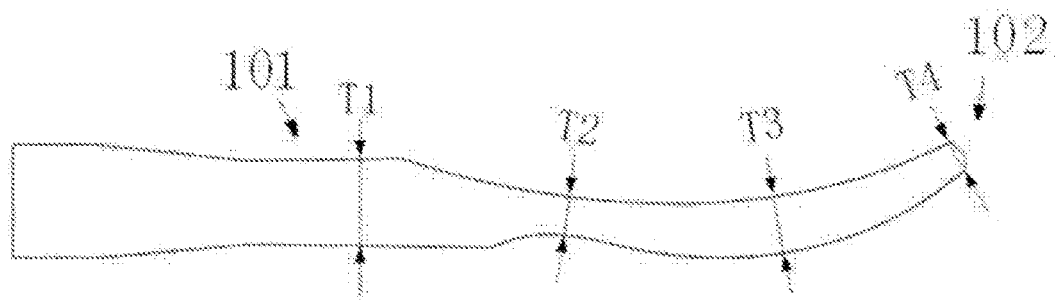
FIGS. 3 and 4 are schematic views showing a projection of an ultrasonic scalpel blade on a shear plane according to the present invention.
Figure 4:
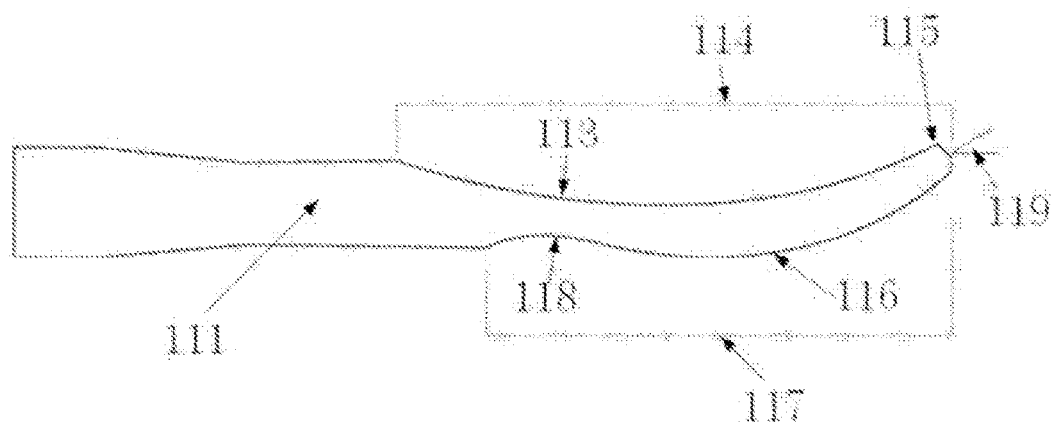

As shown in FIGS. 1 and 2, the present invention discloses an ultrasonic scalpel blade 100 applied to a laparoscopic surgical instrument 110 or an open surgical instrument. The ultrasonic scalpel blade 100 is provided at a distal end of the surgical instrument and cooperates with the oppositely pivotally provided claw pad to perform cutting and/or sealing of tissue.

Referring to FIGS. 3 to 6, an ultrasonic scalpel blade 100 according to a preferred embodiment of the present invention includes a blade tail 101 at a proximal end and a blade tip 102 at a distal end, the engagement surface of the blade with the claw pad of the ultrasonic scalpel assembly being a shear plane.

The projection of the ultrasonic scalpel blade on the shear plane is a banana-like curved shape. A thickness variation is formed from the blade tail 101 to the blade tip 102, and the thicknesses are respectively T1, T2, T3, T4 in order, wherein T1>T3>T2>T4, and T1=T2+T3+T4, with an error of ±10%.

Since the proximal end of the ultrasonic scalpel blade of the present invention is a support end when in use, the size of which must be maximized in order to maintain overall rigidity and stability. The blade tip at a distal end must have a minimum size for better separation and finer handling. For the blade with curved shape, the blade itself may generate bending vibration, thus causing the transverse vibration of the blade body, resulting in abnormal vibration, abnormal sound, and heating. Therefore, the present invention ensures overall balance by controlling the size, shape and relational constraints of each section of the blade.

Specifically, a projection of the ultrasonic scalpel blade on the shear plane is banana-like curved shape, comprising a front concave surface and a rear convex surface, wherein the length 114 of the front concave surface is L1, the radian radius 113 of which is R2. The length 117 of the rear convex surface is L2, which comprises a first convex surface (118) adjacent to the blade tail 101 and a second convex surface (116) adjacent to the blade tip 102; they are in a smooth transition. The radius of the first convex surface is R4 and radius of the second convex surface is R3. The thickness of the blade tail 101 is T1, the thickness of the blade tip 102 is T4, and an angle 119 between the center line of the blade tip and the horizontal line is α, which satisfies the following formula:

$$L1 = L2 + \frac{R2 - R3}{R4} \cdot T1 \cdot \sin\alpha + T4,$$

with an error of ±10%.

The blade tail 101 at a proximal end has a cylindrical section 111 which extends to the proximal end. On the projection on the shear plane, the highest point 115 of the blade tip 102 is higher than the highest point of the cylindrical section 111, and the lowest point of the second convex surface 116 is lower than the lowest point of the cylindrical section 111.

The difference between the arc lengths of the front concave surface and the rear convex surface is jointly determined by the diameter T1 of the rear end support section and the thickness T4 of the blade tip. The blade body designed according to the above-mentioned formula can ensure, to the maximum extent, that the gravity center of the overall design of the curved blade shape is located on the center line of the body, thereby ensuring the stability of the vibration mode. It can be achieved that the highest point of the blade tip is higher than the highest point of the cylindrical section 111, and the lowest point of the second convex surface 116 is lower than the lowest point of the cylindrical section 111. This design ensures that the curvature of the curved blade is maximized while keeps the stability of the vibration pattern. In this way, the lateral vibration in the bending direction can be significantly increased, and a faster rate of heat accumulation can also be produced, which contributes to a firmer coagulation between the vessel walls and thus a more reliable vessel sealing effect is achieved.

In the preferred embodiment, the length L1 of the front concave surface is in the range of 15 mm and 19 mm, preferably 17.5 mm. This length determines the shear length of the final product. An excessive length will lead to a decrease of resonant frequency, an increase of processing difficulty and an increase of resonant stress. When all considered, the selection of 17.5 mm is an ideal parameter.

In the preferred embodiment, the radian radius R2 of the front concave surface is in the range of 19 mm and 25 mm, preferably 22 mm.

In the preferred embodiment, the length L2 of the rear convex surface is in the range of 13 mm and 17 mm, preferably 14.5 mm.

In the preferred embodiment, the radius R4 of the first convex surface of the rear convex surface is in the range of 3 mm and 7 mm, preferably 5 mm.

In the preferred embodiment, the radius R3 of the second convex surface is in the range of 12 mm and 16 mm, preferably 14 mm.

In the preferred embodiment, the thickness T1 of the blade tail is in the range of 2.2 mm and 2.8 mm, preferably 2.6 mm.

In the preferred embodiment, the thickness T4 of the blade tip is in the range of 0.8 mm and 1.2 mm, preferably 0.9 mm. If blade tip is too thick, it can result in a wide shear plane, which is unfavorable to fine operation. If the blade tip is too narrow, it can result in reduced strength and the blade is easy to deform. If the blade tip is too sharp, the risk of accidental injury to healthy tissue during surgery will increase. Therefore, the selection of 0.9 mm of the preferred embodiment is an ideal parameter.

In the preferred embodiment, the angle α between the centerline at the blade tip and the horizontal line is about 30 degrees.

Figure 5:
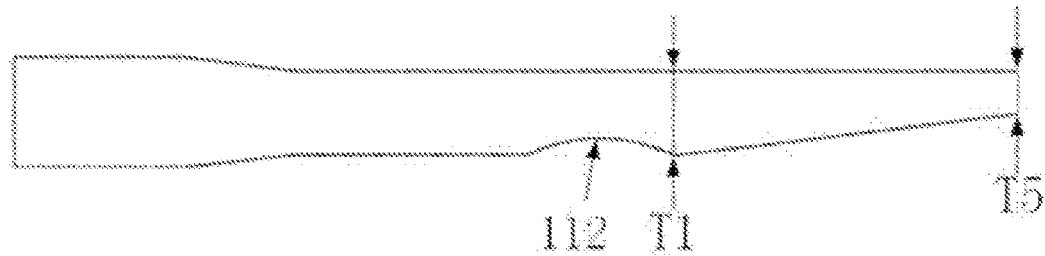
FIG. 5 is a schematic view showing a projection of an ultrasonic scalpel blade on a plane perpendicular to the shear plane according to the present invention.

Specifically, as shown in FIG. 5, in the present invention, the projection of the ultrasonic surgical knife blade on a plane perpendicular to the shear plane is fruit knife-shaped, gradually decreasing in height from the blade tail 101 to the blade tip 102, and an arc-shaped groove 112 being provided near the blade tail 101. This progressive tapered configuration allows for an increase in effective working length. Longer working length can achieve better sealing of large-diameter vessels and faster tissue separation, which effectively reduces the duration of a single cutting and frequency of cutting, thus reduces the fatigue of medical staff.

In the preferred embodiment, the radius R1 of the arc-shaped groove 112 is preferably 7 mm. The distal-most width T5 is half of the proximal diameter T1. The design of this size can ensure that the lowest point of the blade tip is exactly located on the centerline of the blade body, and the removed space volume of the arc-shaped groove 112 can just compensate for the unstable vibration caused by the distal progressive taper structure, which maximizes the increase of effective working length of the progressive taper structure while ensuring the stability.

Figure 6:
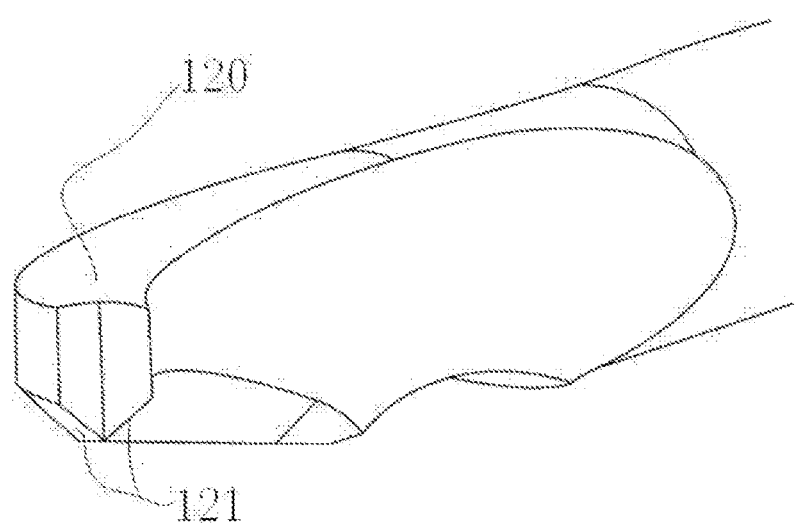
FIG. 6 is a schematic structural view showing a blade tip of an ultrasonic scalpel blade according to the present invention.

As shown in FIG. 6, when viewed in projection along the central axis of the blade tip, an upper end of the blade is provided with an arc-shaped profile 120 and a lower end of the blade is provided with a V-shaped profile 121. The angle formed by the inclined surfaces on both sides of the V-shaped profile 121 is preferably 100 degrees. The arc-shaped profile 120 cooperates with the claw pad to achieve cutting and coagulation of soft tissue. The sharp edge formed by the V-shaped cutting profile 121 facilitates better separation of the membranous tissue.

Figure 7:
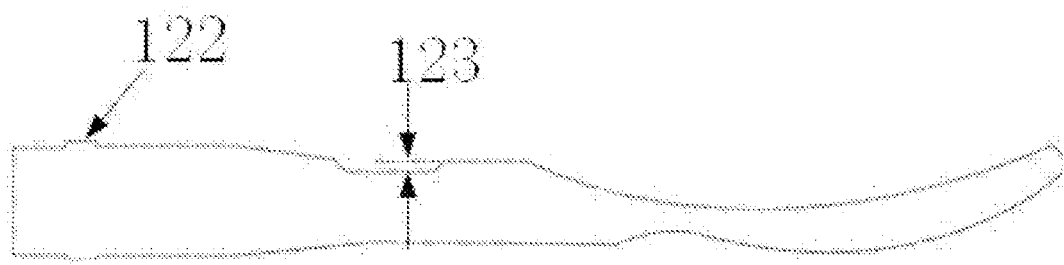
FIG. 7 is a schematic view showing a first embodiment of a balancing groove of an ultrasonic scalpel blade according to the present invention.
Figure 8:
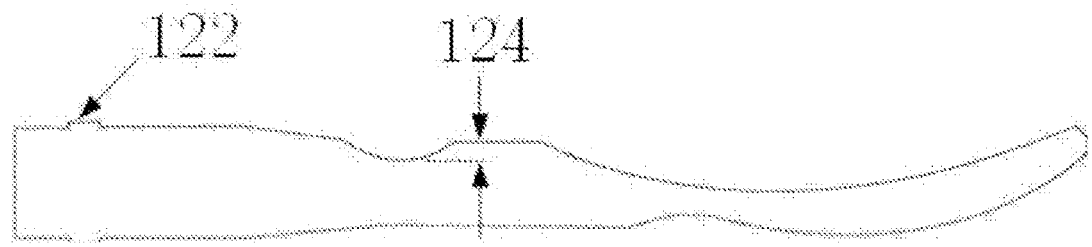
FIG. 8 is a schematic view showing a second embodiment of the balancing groove of an ultrasonic scalpel blade according to the present invention.

As shown in FIGS. 7 and 8, the ultrasonic scalpel blade is provided with at least one balancing groove between the blade tail 101 and the first node 122 of the ultrasonic scalpel. The projection of the balancing groove on the shear plane may be a boat-shaped structure 123 shown in FIG. 7, or an arc-shaped structure 124 shown in FIG. 8, or a combination of a boat-shaped structure and an arc-shaped structure. Such a structure serves to improve the stability of the ultrasonic vibration. As mentioned above, the blade shape design and the curved asymmetric blade structure design would easily lead to unstable operation of the blade. Considering the deviation of machining and the bending of long and straight blade body, the final product may generate very large bending vibration, torsional vibration, or other forms of vibration. This can reduce system stability, produce abnormal noise, reduce ultrasound transmission efficiency, produce abnormal heating, and other adverse results. In view of the above, the present invention proposes the addition of one or more balancing grooves, and preferably, the compensation position is located between the most distal node and the center position of the blade.

The above is only a preferred embodiment of the present invention, and it should be noted that the above-mentioned preferred embodiment should not be construed as limiting the present invention, but the scope of the present invention should be determined by the scope of the appended claims. It will be apparent to a person skilled in the art that various modifications and variations can be made in the present invention without departing from the spirit or scope of the disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An ultrasonic scalpel blade, comprising:
a blade tail at a proximal end and a blade tip at a distal end of the ultrasonic scalpel blade; and
an engagement surface between the ultrasonic scalpel blade and a claw pad of an ultrasonic scalpel assembly, the engagement surface being a shear plane,
wherein a projection of the ultrasonic scalpel blade on the shear plane has a curved shape,
wherein the ultrasonic scalpel blade has varied thicknesses from the blade tail to the blade tip, and
wherein the varied thicknesses are respectively T1, T2, T3, T4 in order from the blade tail to the blade tip, wherein T1>T3>T2>T4, and T1=T2+T3+T4, with an error of ±10%.

2. An ultrasonic scalpel blade, comprising:
a blade tail at a proximal end and a blade tip at a distal end of the ultrasonic scalpel blade; and
an engagement surface between the ultrasonic scalpel blade and a claw pad of a ultrasonic scalpel assembly, the engagement surface being a shear plane,
wherein a projection of the ultrasonic scalpel blade on the shear plane has a curved shape, comprising a front concave surface and a rear convex surface, wherein the front concave surface has a length of L1 and a radius of curvature of R2,
wherein the rear convex surface has a length of L2 and comprises a first convex surface adjacent to the blade tail and a second convex surface adjacent to the blade tip, wherein the ultrasonic scalpel blade includes a smooth transition between the first convex surface and the second convex surface;
wherein the first convex surface has a radius of curvature of R4 and the second convex surface has a radius of curvature of R3;
wherein a thickness of the blade tail is T1, a thickness of the blade tip is T4, and an angle between a center line at the blade tip and a horizontal line is α, and
wherein the length L1 of the front concave surface satisfies the following formula:

$$L1 = L2 + \frac{R2 - R3}{R4} \cdot T1 \cdot \sin\alpha + T4,$$

with an error range of +10%.

3. The ultrasonic scalpel blade according to claim 2, wherein the length L1 of the front concave surface is in the range of 15 mm and 19 mm.

4. The ultrasonic scalpel blade according to claim 2, wherein the radius of curvature R2 of the front concave surface is in the range of 19 mm and 25 mm.

5. The ultrasonic scalpel blade according to claim 2, wherein the length L2 of the rear convex surface is in the range of 13 mm and 17 mm.

6. The ultrasonic scalpel blade according to claim 2, wherein the radius of curvature R4 of the first convex surface of the rear convex surface is in the range of 3 mm and 7 mm, and the radius of curvature R3 of the second convex surface is in the range of 12 mm and 16 mm.

7. The ultrasonic scalpel blade according to claim 2, wherein the blade tail at the proximal end of the ultrasonic scalpel blade has a cylindrical section which extends to the proximal end.

8. The ultrasonic scalpel blade according to claim 7, wherein a highest point of the blade tip is higher than a highest point of the cylindrical section, and wherein a lowest point of the second convex surface is lower than a lowest point of the cylindrical section.

9. The ultrasonic scalpel blade of claim 1, wherein a length of a front surface of the ultrasonic scalpel blade is in the range of 15 mm and 19 mm.

10. The ultrasonic scalpel blade of claim 1, wherein a length of a rear surface of the ultrasonic scalpel blade is in the range of 13 mm and 17 mm.

11. The ultrasonic scalpel blade of claim 1, wherein a length of a front surface of the ultrasonic scalpel blade is different than a length of a rear surface of the ultrasonic scalpel blade.

12. The ultrasonic scalpel blade of claim 1, wherein the ultrasonic scalpel blade includes at least one balancing groove between the blade tail and a first node of the ultrasonic scalpel blade.

13. An ultrasonic scalpel blade, comprising:
a blade tail at a proximal end and a blade tip at a distal end of the ultrasonic scalpel blade,
wherein an engagement surface between the ultrasonic scalpel blade and a claw pad of an ultrasonic scalpel assembly is a shear plane,
wherein a projection of the ultrasonic scalpel blade on the shear plane is a curved shape; and a projection on a plane perpendicular to the shear plane is progressively tapered,
wherein a height of the ultrasonic scalpel blade gradually decreases from the blade tail to the blade tip, and
wherein the blade tail includes an arc-shaped groove.

14. The ultrasonic scalpel blade according to claim 13, wherein the ultrasonic scalpel blade has an arc-shaped profile at an upper end and a V-shaped profile at a lower end.

15. The ultrasonic scalpel blade according to claim 13, wherein a width of the distal end of the ultrasonic surgical blade in a direction perpendicular to the shear plane is half of a diameter of the proximal end.

16. The ultrasonic scalpel blade of claim 13, wherein a length of a front surface of the ultrasonic scalpel blade is different than a length of a rear surface of the ultrasonic scalpel blade.

17. A device, comprising:
an ultrasonic surgical knife blade configured to cooperate with a claw pad of a surgical instrument, including:
a blade tail at a proximal end and a blade tip at a distal end of the ultrasonic surgical knife blade,
wherein an engagement surface between the ultrasonic surgical knife blade and a the claw pad of the surgical instrument is a shear plane,
wherein a projection of the ultrasonic surgical knife blade on the shear plane is a curved shape, and
wherein the ultrasonic surgical knife blade includes at least one balancing groove between the blade tail and a first node of the ultrasonic surgical knife blade.

18. The according to claim 17, wherein the projection of the balancing groove on the shear plane is a channel; or is curved, or is a curved channel.

19. The ultrasonic scalpel blade of claim 17, wherein the least one balancing groove is a depression or cavity in a front surface of the blade tail.

20. The ultrasonic scalpel blade of claim 17, wherein the blade tail has a flat surface or a curved surface at a bottom of the at least one balancing groove.

* * * * *